United States Patent
Pray

[11] 3,913,180
[45] Oct. 21, 1975

[54] RIVETING SYSTEM AND NAIL AND RIVET ASSEMBLY THEREFOR

[75] Inventor: Winston C. Pray, Lombard, Ill.

[73] Assignee: Flexible Steel Lacing Company, Downers Grove, Ill.

[22] Filed: June 10, 1974

[21] Appl. No.: 477,795

[52] U.S. Cl. .............. 24/31 B; 24/33 B; 74/231 J; 85/37
[51] Int. Cl.² . F16B 13/06; F16G 3/02; F16B 35/00
[58] Field of Search.............. 74/231 J; 85/68, 37; 24/37, 31 L, 31 H, 33 L, 31 B, 33 B, 31 R, 33 R

[56] References Cited
UNITED STATES PATENTS

| | | | |
|---|---|---|---|
| 1,134,139 | 4/1915 | Kennedy | 24/31 B |
| 1,705,794 | 3/1929 | Wheeler et al. | 85/37 |
| 2,590,585 | 3/1952 | Temple | 85/37 UX |
| 3,141,346 | 7/1964 | Dean | 74/231 J |
| 3,501,971 | 3/1970 | Peterson | 24/31 B X |
| 3,638,281 | 2/1972 | Francois | 24/31 B |
| 3,742,557 | 7/1973 | Francois | 24/33 B |
| 3,772,957 | 11/1973 | Newton | 85/68 |

FOREIGN PATENTS OR APPLICATIONS

| | | | |
|---|---|---|---|
| 807,626 | 10/1936 | France | 85/37 |
| 914,381 | 6/1946 | France | 85/37 |
| 1,226,837 | 10/1966 | Germany | 24/33 B |

*Primary Examiner*—Donald A. Griffin
*Attorney, Agent, or Firm*—Fitch, Even, Tabin & Luedeka

[57] ABSTRACT

A system is disclosed for riveting together two elements where one end of the rivet is not always accessible for deforming by a tool to form a rivet head. Specifically, an element such as a belt fastener is attached by rivets to another element such as a belt by driving a combined rivet and nail assembly through an aperture in the fastener and the belt and into an anvil support means which limits further travel of the nail. A continued application of force to the exposed end of the rivet shifts the inner end of the rivet relative to the nail with an anvil surface on the nail deforming the inner rivet end into a rivet head, which has separated from the nail. Another anvil surface for further shaping and seating of the inner rivet head may be provided on the anvil support means.

23 Claims, 19 Drawing Figures

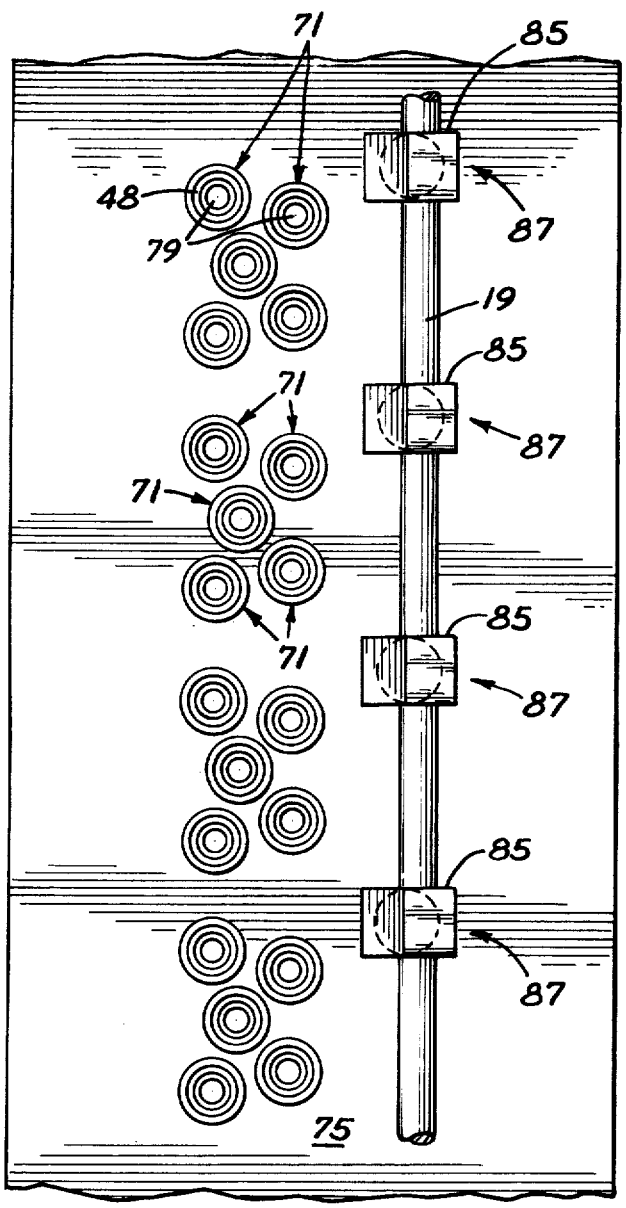
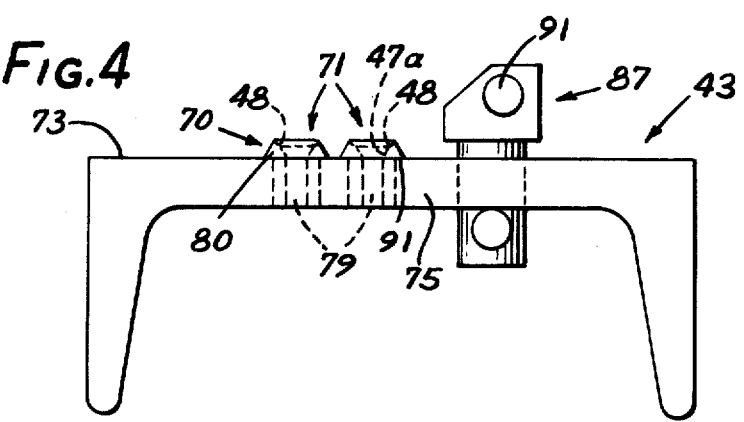

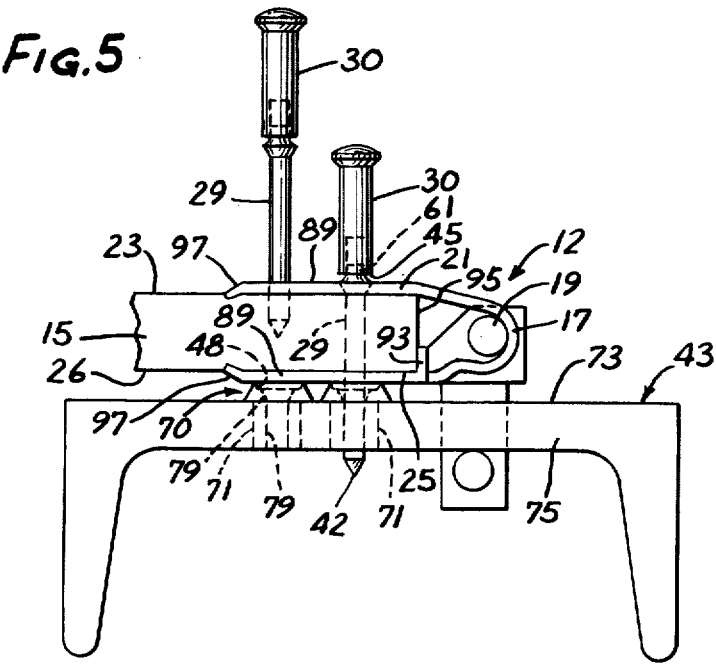
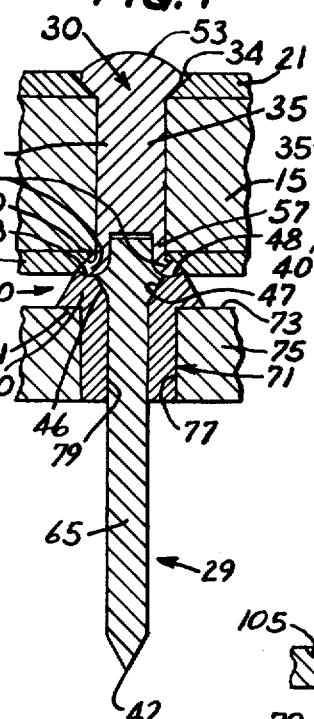
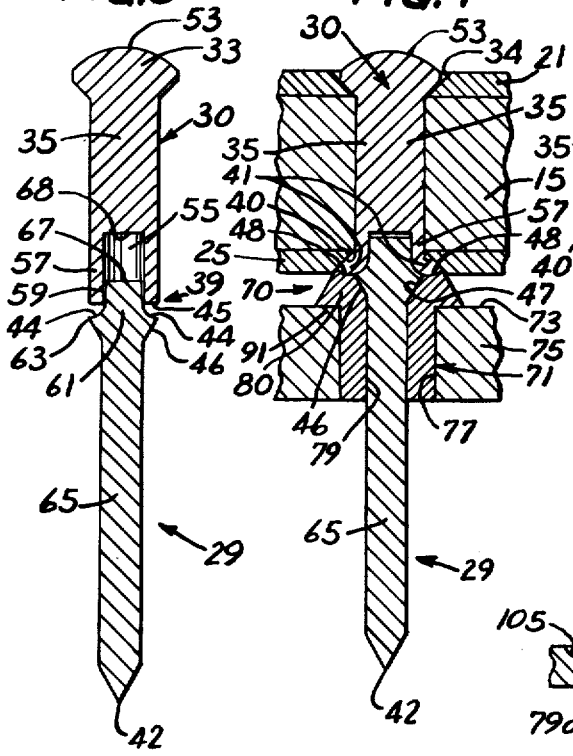
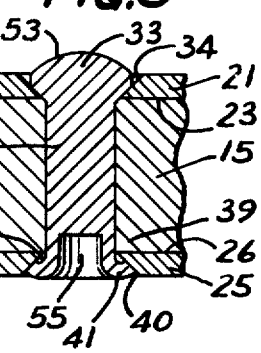
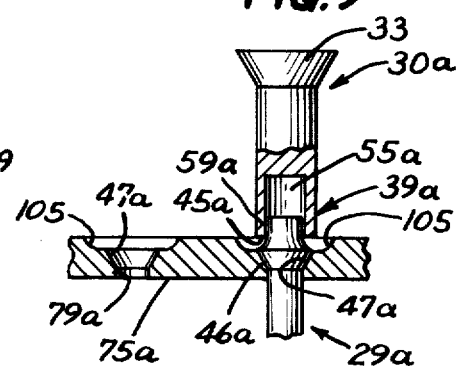
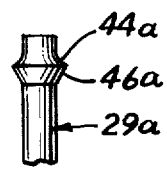

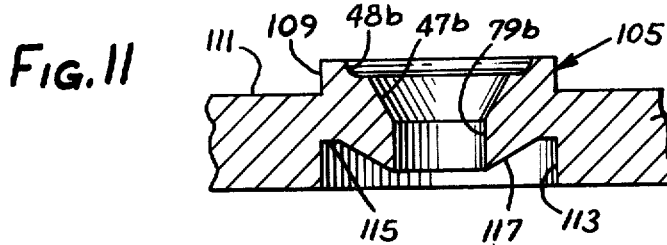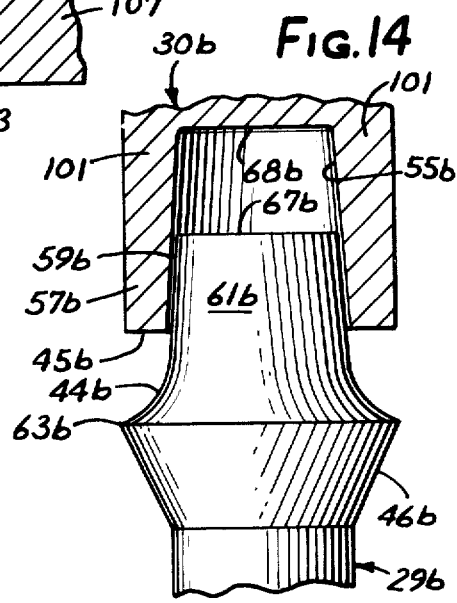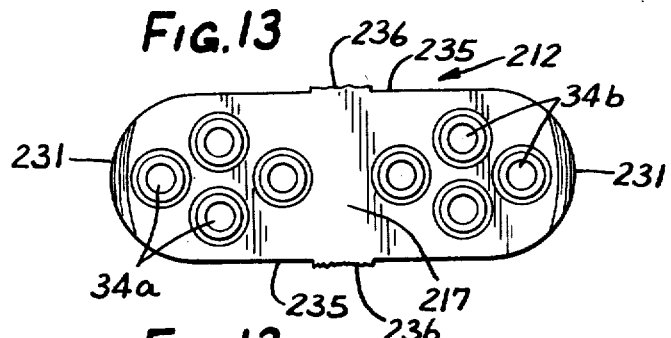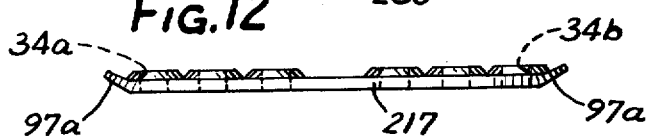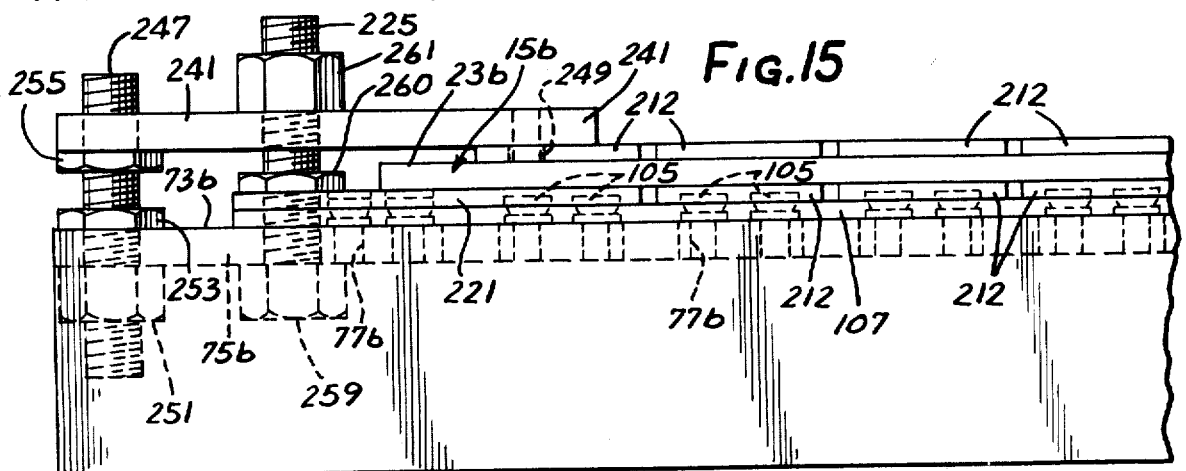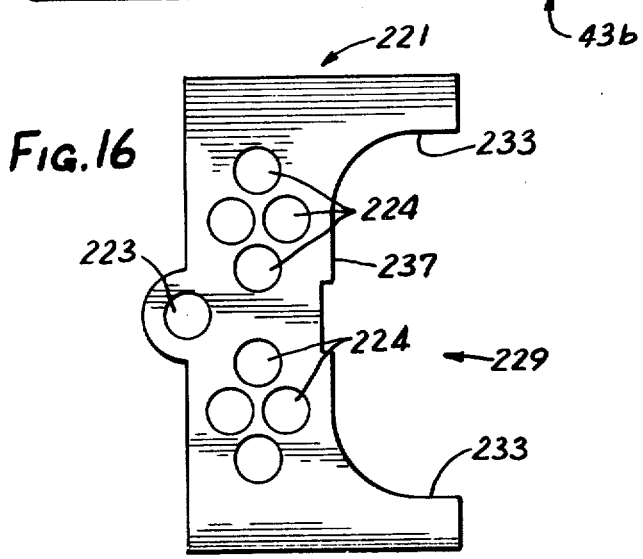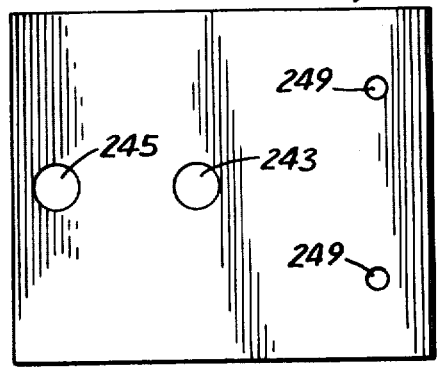

RIVETING SYSTEM AND NAIL AND RIVET ASSEMBLY THEREFOR

This invention relates to a system for securing one element to another element by rivets and more particularly to such system where the inner end of the rivet may not be readily accessible for deforming to form a rivet head.

The system disclosed herein may be used to join various and diverse elements together and the present invention is not to be construed as limited to the illustrated and described embodiment of invention wherein one element is a belt fastener and the other element is a belt such as a conveyor belt. The invention is described herein in connection with two kinds of belt fasteners, the first being a plate belt fastener such as shown in U.S. Pat. No. 3,141,346 and the second being a hinged belt fastener such as shown in U.S. Pat. Nos. 3,742,557 and 3,176,358. In both kinds of belt fasteners, upper and lower portions thereof are secured to the top and bottom surfaces of a belt by rivets. The plate belt fasteners differ from the hinge belt fasteners in that the plates span the gap between belt ends whereas in the hinge belt fastener, each plate is formed with a central U-shaped hinge portion with adjacent hinge portions pivotally connected by a hinge pin. Usually, a plurality of belt fasteners are attached to each transverse end of the belt. The belt fasteners are secured tightly to and generally flush against the respective top and bottom sides of the conveyor belt by a plurality of rivets which project through the belt and are driven against the belt fasteners to maintain them in tight engagement with the belt. The rivets may have a preformed head which seats in a depression in the top plate or fastener and the opposite end of the rivet is upset or flared to form a lower rivet head, seated in a depression in the lower plate or fastener.

To assist penetration of the rivet through the belt and into the aperture in the underlying bottom plate of a hinge belt fastener, a pilot nail or mandrel has been used in combination with the rivet, as disclosed in U.S. Pat. No. 3,742,557. This patent discloses an adhesive tape securing the pilot nail to the rivet; and, as the pilot nail is driven in through the belt, the adhesive tape is automatically stripped therefrom thereby automatically separating the rivet from the nail. To form a rivet head on the bottom side of the belt, the belt is either overturned to expose the inner ends of the rivets to a riveting tool, such as shown in FIG. 12 of the patent, or access was had from beneath the belt to use the riveting tool to form the lower rivet heads.

Often, it is not possible to turn the belt to expose the inner rivet ends; or it is difficult or impossible to reach the interior ends of the rivets. Since the plate fasteners span abutted belt ends, it is not possible to flex and turn the belt to expose the underside thereof as with the hinge kind of belt fasteners. Thus, there is a particular need for an improved system for riveting plate kind of belt fasteners.

The time required to install and the ease of applying a belt fastener are important. Particularly, when a conveyor in a mine or other operation is out of commission, the amount of downtime needed to join the belt ends may be the most significant consideration. Even where the belt may be readily turned, the use of the riveting tool to upset the inner ends of rivets may be an arduous and time-consuming task.

With the system of the present invention, the inner ends of the rivets may be upset without turning the belt and without the use of the rivet tool heretofore employed. Also, the preferred system assists in accurately spacing and aligning the rows of belt fasteners relative to the belt ends and to each other to receive a hinge pin. The present invention allows installing these belt fasteners where, heretofore, it has not been possible to use this kind of belt fastener and still retain the use of pilot nails to penetrate and guide a rivet through the belt.

Accordingly, a general object of the present invention is to provide a new and improved system for riveting together two elements, particularly where the inner ends of the rivets are not accessible for deformation by the usual manual rivet tool.

Another object of the invention is to provide a new and improved system for securing belt fasteners to a belt end.

A further object of the invention is to provide a new and improved nail and rivet for use in securing elements together.

Another object of the invention is to provide an improved anvil means for use with an anvil nail means to upset an inner rivet end.

Other objects and advantages of the invention will become apparent from the following detailed description taken in connection with the drawings in which:

FIG. 3 is a plan view of an anvil support means, as shown in FIG. 1, with the belt and belt fasteners removed therefrom;

FIG. 4 is a side view of the anvil supporting means of FIG. 3;

FIG. 5 illustrates driving a nail and rivet through the belt and into the anvil supporting means;

FIG. 6 is an enlarged, longitudinal, cross-sectional view of a nail and rivet constructed in accordance with the preferred embodiment of the invention;

FIG. 7 is an enlarged, fragmentary, cross-sectional view of an inner end of a rivet being flared in accordance with the preferred embodiment of the invention;

FIG. 8 is a cross-sectional view of a rivet securing a portion of the belt fastener to the belt;

FIG. 9 is a fragmentary, cross-sectional view of another embodiment of a nail and rivet assembly;

FIG. 10 is a view of the head of the anvil nail used in the embodiment of the invention shown in FIG. 10.

FIG. 11 is an enlarged fragmentary, sectional view of an anvil supporting means made in accordance with another embodiment of the invention;

FIG. 12 is side elevational view of a plate fastener;

FIG. 13 is a plan view of a plate fastener;

FIG. 14 is an enlarged, fragmentary, sectional view of a tapered rivet wall fastened to a tapered end of an anvil nail;

FIG. 15 is an end view of another anvil means such as used for joining plate fasteners to a belt;

FIG. 16 is a lower guide for plate fasteners for use with the anvil means of FIG. 15;

FIG. 17 is a top plate fastener guide for use with the anvil means of FIG. 15;

Figure 1:
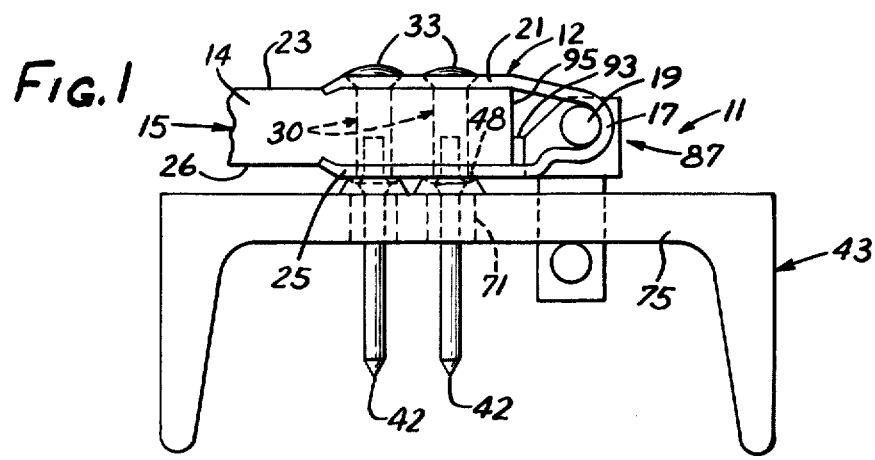
FIG. 1 is an end elevational view of a belt fastener being attached to a belt end by a novel nail and rivet and a novel system embodying the invention.
Figure 2:
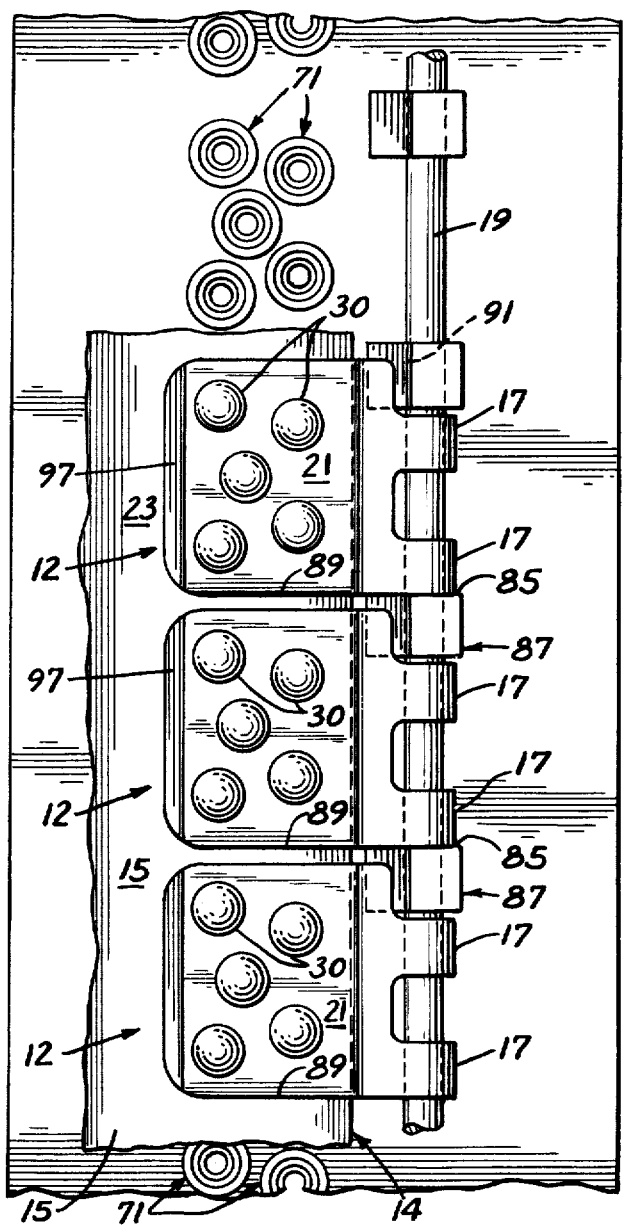
FIG. 2 is a fragmentary plan view of a portion of FIG. 1.
Figure 18:
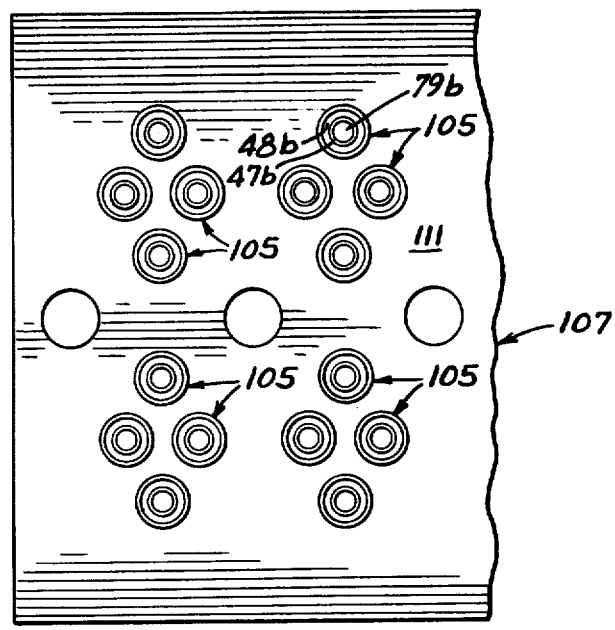
FIG. 18 is a plan view of the anvil supporting means of FIG. 11.

As shown in the drawings for purposes of illustration, the invention is embodied in a system 11 for securing a first element such as a belt fastener, either a hinge belt fastener 12 (FIG. 1) or a plate belt fastener 212 (FIG. 12), to an end 14 of a second element such as a conveyor belt 15. The invention will first be described in connection with the hinge kind of belt fastener 12. As shown in FIG. 2, the conveyor belt 15 is usually much wider than an individual belt fastener 12 and therefore a series of belt fasteners 12 are aligned and secured to the transverse end 14 of the belt. While not shown, the other end of the belt is likewise provided with a similar series of belting fasteners which will have hinge pin receiving U-shaped portions interleaved with U-shaped hinge pin receiving portions 17 of the illustrated belt fasteners to receive a common hinge pin, which is generally in appearance similar to a gauge pin 19 inserted through the U-shaped hinge portions 17 of the respective belt fasteners to align them as shown in FIGS. 1 and 2.

The belt fasteners 12 are usually formed of metal with a generally flat upper plate 21 for engagement with an upper side or face 23 of the belt 15. A lower plate 25 on each belt fastener abuts a lower face 26 of the belt 15. A plurality of rivets 30 secure each belt fastener 12 to the belt 15 with an outer or upper head 33 (FIGS. 6, 7 and 8) preformed thereon and seated in a depression in the upper plate and projecting into an aperture 34 in the top plate 21 to abut the latter. An elongated rivet body or shank 35 on each rivet extends through the belt with a lower or inner end 39 of the rivet passing through an aperture 40 in the bottom plate. The lower end 39 of each rivet must be deformed to form an enlarged lower head 41 and which engages the underside of the bottom plate 25 about the aperture 40 therein.

To assist the insertion of a rivet body 35 through the belt 15 and entrance of the rivet end 39 into an aperture 40, a nail 29 is separably attached to the rivet end 39 so that by application of suitable force to the rivet head 33, pointed end 42 of the nail is forced through the belt with the rivet body following to span the pair of apertures 34 and 40 formed in the respective upper and lower plates 21 and 25. Then, it is necessary to deform or flare the lower ends 39 of the rivets to form the heads 41 abutting the lower plate 25 of the fasteners 12.

Where a large number of rivets 35 and fasteners 12, e.g., five rivets for each fastener and the wide belt illustrated herein, a turning of the belt end 14 over and the use of a manual rivet upsetting tool (not shown) and hitting the tool with a hammer to deform the now exposed lower ends 39 of the rivets is a time-consuming and tiresome task. Moreover, in some instances, access cannot be gained to the underside of the conveyor belt 15 so as to permit the use of the rivet tool and hammer at the underside of the belt for upsetting the lower ends 39 of the rivets. As will be explained hereinafter in connection with plate fasteners 212, the adjacent belt ends are abutted and the flat plates 212 spanning and joining the belt ends prevent the turning over of the belt ends to allow use of the rivet tool from above. Often, it is not possible to reach the rivet ends and to hammer the rivet ends from beneath the belt when using plate belt fasteners 212. Thus, there is a need for a new and improved manner of deforming or upsetting the lower ends 39 of rivets 30 used to secure belt fasteners 12 or 212 without having to turn over the belt end 14 and in a quick and more economical manner.

In accordance with the present invention, the lower ends 39 of the rivets 30 may be formed with heads 41 without having access to the lower ends of the rivets because one of the elements such as the belt end precludes access to the rivet ends 39 for hammering with a rivet tool. To these ends, the rivet ends are deformed by an anvil surface means 44 on the nails 29 to upset and deform the lower ends 39 of the rivets 30 after the nails have traveled through the belt and into an underlying anvil support means 43. Thus, a continued application of force to the upper heads 33 of the rivets 30 as with a hammer drives the nails 29 into the support means, which arrests the nails, so that further downward movement of the rivets under additional hammering causes the lower ends of the rivets to flare and deform along the anvil surfaces into the heads 41. To achieve the deformation of the lower ends 39 of the rivets by the anvil nail surfaces 44, the latter are provided with outwardly flaring curved surfaces which serve to flare radially outwardly the thin wall of the rivets as the lower edge 45 of each rivet abuts the anvil surface and rivet is continued to be driven downwardly. Herein, the anvil nails 29 are held against further downward movement during the deformation of lower rivet ends by a stop surface 46 thereon abutting stop surfaces 47 on the anvil support means 43, the latter is positioned beneath the belt and is rested on a conveyor dead plate or other stationary surface. The anvil support means may have shapes other than that described herein to receive the anvil nail and limit its travel during the formation of the rivet head 41.

In this preferred embodiment of the invention, the lower rivet heads 41 are initially flared by the anvil nail surfaces 44 and are finally seated and formed by anvil surfaces 48 as best seen in FIG. 7, on the support means 43. More specifically, the anvil surfaces 48 on the support means are disposed outwardly and encircle the nail anvil surfaces 44 and are abutted by a rivet end only after it has been spread radially outward thereto by the nail anvil surface 44. It is then that the anvil surfaces 48 deflect the rivet ends more generally upwardly into positions and into depressions in the lower surface of the belt fastener with the rivet material being rolled and peened and compressing the belt between the upper and lower plates or fasteners to assure that the fasteners are disposed tightly against the upper and lower sides of the belt. That is, the continuing hammering of the rivet on its upper head 33 compresses the belt and causes the rivet to be moved downwardly and causes the upper plate 21 to be forced tightly against the upper belt surface as the lower plate 25 is being simultaneously forced tightly into engagement with the lower surface of the belt and rivet head 41 is being driven and rolled into tight engaging relationship with the lower belt surface. The belt fasteners must be held tightly against the belt.

Also in accordance with this preferred system, the anvil support means comprises means for spacing plurality of fasteners 12 at predetermined intervals across the belt end. Moreover, when hinge fasteners are being used, the U-shaped hinge portions 17 are properly positioned and located by the gauge pin 19 so that a hinge pin (not shown) may be readily aligned and slid between the hinge U-shaped openings 17 for each of the opposite sets of fasteners on the respective belt ends.

Referring now in greater detail to the rivet 30, it is a commercially available and conventional kind made from metal, for example, a corrosion resistant metal such as stainless steel, straight steel or an alloy, such as monel. The rivets may have various diameters for their bodies, with the illustrated rivet having a nominal 3/16 inch body diameter. In a conventional manner, the rivet has its upper head 33 preformed with a generally rounded outer surface 53 and with its lower opposite end 39 formed with a cylindrical bore 55 extending axially from the lower edge 45 of the rivet and defining a thin lower cylindrical wall 57 which may be upset or deformed to form the rivet head 41 shown in FIG. 8.

In the illustrated and preferred embodiment of the invention, the rivet 30 and the anvil nail 29 are joined together by a bonding means 59 (FIG. 6) which is preferably in the form of a glue, adhesive or a bonding agent of the predetermined strength which holds them together for initial handling and for driving into the belt. The bonding means 59 does not break when the nail and the rivet pierce the belt, as does the exterior tape used heretofore, so that the anvil nail surface 44 remains aligned with the rivet end to accomplish the flaring of the rivet end. It is the flaring of the rivet wall 57 from the nail 29 which automatically breaks the adhesive bond means 59 and separates the rivet from the nail. When joining the rivet and nail, an upper cylindrical end 61 of the anvil nail is telescoped into the bore 55 with the nail end 61 coated with an adhesive which adheres to the inner surface of the circumferential wall 57 of the rivet. Other means may be used to join the rivet and anvil nail together and fall within the purview of the invention.

For the purposes of deforming the lower rivet end 39, the preferred anvil surface 44 has an upwardly opening and outwardly extending arcuate curvature. In this illustrated embodiment of the invention, the anvil surface has a 0.047 inch radius curvature on the upper side of an enlarged shoulder 63 formed adjacent the top of the nail. The anvil surface 44 extends from the cylindrical shank portion 65 of the nail to the outer and maximum diameter for the shoulder. Herein, the maximum shoulder diameter is 0.184 inch, and it is located 0.080 inch beneath a top surface 67 at the head of the anvil nail. The upper nail end 61 is relatively short compared with the pilot nail used with a rivet in the aforementioned patent so that it will not abut its top surface 67 with end wall 68 at the top of the rivet 55. Also, the flaring of the rivet material should be terminated short of the end wall 68 or else lines of stress or fracture sometimes develop adjacent the end wall in the rivet end wall 57.

Herein, the anvil nail has a nominal shank diameter of about 0.120 inch. For the purpose of limiting downward travel of the nail, the stop surface 46 on the anvil nail 29 is preferably a conical surface disposed at an angle of about 28° to the vertical to abut a similar inclined conical surface 47 on the anvil support means 43. The nail is a harder metal than the rivet metal and has a thicker cross section than the rivet wall 57 so that the rivet metal rather than nail metal displaces and forms the rivet head. Manifestly, other shapes and sizes of anvil surfaces and nails and rivets may be used and fall within the purview of the present invention, the sizes described herein being merely illustrative and not limiting of the invention.

To assist in driving the flared lower rivet ends 41 upwardly and tightly against lower plate 25 of the belt fastener 12 and to assure that the lower plate 25 is driven upwardly tightly against the lower surface 26 of the belt, the anvil means is formed with upwardly projecting means 70 in the form of projections which may be integrally formed on the anvil means 43, as shown in FIG. 11 and described hereinafter, or in the form of buttons 71, as shown in FIG. 1. The latter project upwardly from the general planar surface 73 of the anvil means 43 which is preferably channel shaped having an upper flat horizontal web 75 with apertures 77 into which are inserted the buttons 71. The buttons 71 are precisely located on the web 75 so that each bore 79 in a button is disposed immediately beneath a pair of apertures 34 and 40 in a belt fastener to receive therein the lower end of a nail 29. Herein, the stop surfaces 47 for limiting travel of the nails are formed as conical surfaces in enlarged head portions 80 on the buttons at the top portions of the nail receiving bores 79 in the buttons. These head portions 80 of the buttons have radially extending shoulders 91 for abutting the upper surface 73 of the web 75 and holding the same against being forced through the support means 43.

As best seen in FIGS. 2 and 3, the buttons 71 are arranged in clusters of five at each of the belt fastener 12 locations with the buttons being spaced from one another and from locating surfaces 85 on the anvil support means 43 so that the bores 79 in the buttons are aligned with the apertures 34 and 40 in the belt fastener plates 21 and 25. Herein, the locating surfaces 85 are vertically extending surfaces formed on one side of each of a series of upstanding posts 87 fastened to and supported by the web 75 of the anvil support means 43. Side edges 89 on the upper and lower plates 21 and 25 of each of the belt fasteners 12 are abutted against the locating surfaces 85 and the gauge pin 19 is inserted through apertures 91 in the upstanding blocks 87 and through the U-shaped hinge portions 17 of the belt fasteners. Also, as best seen in FIGS. 1 and 5, each of the belt fasteners has an upstanding lug 93 upturned from the bottom plate 25 at a location adjacent the hinge portion 17 for abutting end wall 95 of the belt 15. This lug 93 functions to limit the amount of insertion of the belt end into the space between the upper and lower plates 21 and 25. Therefore, with the belt end 95 abutting the lugs 93 on each of the belt fasteners 12 and with the belt fasteners abutting their sides 89 against the respective gauge surfaces 85 and with the gauge pin 19 inserted through the respective U-shaped hinge openings 17, the belt fasteners 12 will be properly aligned over the clusters of buttons 71 on the anvil support means 43 with apertures 34 and 40 in the belt fastener plates aligned with the bores 79 in the buttons 71.

Each of the upper and lower plates 25 is provided with beveled transversely extending free ends 97 which, when the rivets are driven into position, bites or penetrates slightly into the adjacent surface of the belt as the inner sides of the plates are hammered into tight and intimate contact with belt surfaces. Herein, the beveled free ends 97 are aligned in a common vertical plane.

Although the preferred embodiment of the invention uses additional anvil surfaces 44 on the buttons 71, the anvil nails alone may be used to form rivet heads on the inner ends of the rivets, as will be explained hereinafter in connection with FIGS. 9 and 10. Common reference characters with a suffix a added are used herein to designate elements hereinabove described.

In the embodiments of FIGS. 9 and 10, the rivet 30a is secured by a frangible bonding means 59a to an upper end of an anvil nail 29a. The latter is received directly in the bore 79a of the web 75a of the anvil support means 43a and is arrested in its downward movement when its conical stop surface 46a abuts the complementary conical stop surface 47a on the web 75a. In accordance with this embodiment of the invention, the anvil surface 44a on the nail 29a performs the entire flaring of the lower ends 39a of the rivets 49a into rivet heads (not shown) but generally similar to the rivet heads 41a shown in FIG. 8. There is, of course, no additional or secondary anvil surfaces on the anvil support means 43a similar to the anvil surfaces 48 on the buttons 71 described above in connection with the preferred embodiment of the invention. Instead, a ring-shaped groove or depression 105 encircles each of the nail receiving bores 79a and stop surfaces 47a to allow the outward flaring of the circumferential rivet wall 57a as the lower end 39a of the rivet cams along the anvil surface 44a.

In accordance with a further embodiment of the invention, the rivet and anvil nail assembly may be changed at the juncture therebetween, as shown in FIG. 14, by providing a uniformly decreasing cross-sectional thickness for the lower rivet wall 57b between its upper portion and its lower edge 45b. This cross-sectional thickness is reduced from that of a constant thickness for the wall 57 described above in order to facilitate the bending and deforming of the wall 57 and the rolling of the same into a rivet head.

In this embodiment of the invention, the taper for the wall 57b is approximately 5° to the vertical. Likewise, the upper end 61b of the anvil nail is provided with a complementary 5° taper with its upper end having the smallest diameter. This spaces the nail end 61b from the rivet wall throughout and provides a space for a bonding agent 59b to connect the rivet 30b to the anvil nail 29b.

The height of the upper end 61b of the nail 29b above its maximum diameter shoulder 63b and the extent of the lenght of the rivet bore 55b are related to assure that rolling deformation of the rivet wall 57b into the rivet head occurs before the nail head 67b bottoms on the rivet end wall 68b and also before rolling deformation occurs in the area 101 adjacent the top end of the bore 55b. This relationship is also true of the rivet and nail assemblies above described. It has been experienced that rolling deformation of the rivet wall to a point closely adjacent the end wall 68b causes undue stress at or adjacent the area 101 such that fracturing of the lower rivet head sometimes occurs with fatigue and after some useage of the belt. Herein, the spacing between the major diameter at shoulder 63b and the top of the anvil nail 67b has been limited to 0.080 inch so as not to overstress the area 101 during the formation of the head, these dimensions being by way of illustration and not limiting of the present invention.

In accordance with another embodiment of the invention, the cost of the anvil means 43 may be reduced considerably by the elimination of the separate buttons 71 and providing the upwardly projecting means in the form of integrally stamped anvil projections 105, as best seen in FIG. 11, formed by a punching operation on a flat metal sheet or plate 107. More specifically, a flat metal sheet, for example, a ⅛ inch sheet of steel, is punched to drive a generally cylindrical upstanding wall 109 upwardly of the plane of the top surface 111 of the metal plate. The upstanding anvil projection means 105 is provided with a central bore 79b into which will be projected the shank of the anvil nail 29. A tapered stop surface 47b is provided on the projection means 105 to aubt the tapered surface 46, 46a, or 46b on an anvil nail to limit further downward movement of the anvil nail, as explained above. The tapered surfaces 46, 46a and 46b also assist in penetrating through the belt without tearing fibers from the belt as would blunt surfaces. Also, anvil surface 48b is provided above the stop surface 47b to cooperate with the nail anvil surface 44, 44a, or 44b to complete the rolling deformation of the rivet wall into the depression in the lower plate element of the belt fastener.

The metal pushed upwardly from the anvil plate 107 to form the anvil projection means 105 leaves a generally circular depression 113 in the bottom of the plate 107 comprising an upper annular wall 115 leading to a downwardly frustoconical wall 117. The plate 107 will have all of the openings placed therein at the locations shown in FIG. 2 for the button 71 when the anvil plate is made for connecting hinge belt fasteners. The plate 107 could also be formed with dependent flanges integral therewith to form the entire channel-shaped member or it may be used with a channel-shaped member having apertures 77 already therein but without the buttons 71.

The present invention is of particular utility for connecting adjacent ends of a belt by plate fastener means, such as shown in FIGS. 12 and 13, in which a first set of rivets extend through openings 34a to join each plate fastener 212 to one end of the belt and a second series of rivets are inserted through openings 34b in the other end of the same belt fasteners 212 to join the plate fastener 212 to the other end of the belt. Unlike the hinge belt fasteners, a solid imperforate center portion 217 on each plate belt fastener 212 spans the juncture of adjacent belt ends. That is, the hinge belt fastener, such as shown in FIG. 1, is connected to only one end of the belt, and hence it may be usually turned to expose the underside of the belt from above. But with the plate belt fasteners fastened to both belt ends, a belt end cannot be turned to expose its lower surface and the lower ends of the rivets. Herein, each belt fastener means comprises an upper plate fastener 212 and a lower plate fastener 212 which are separate from each other, the only difference between them being the shape of the ends 97a. The ends 97a of the lower plate fasteners 212 are turned upwardly to bite into the belt, as shown in FIG. 12 whereas the ends (not shown) of the upper plate fasteners 212 are turned downwardly to bite into the belt.

To fasten the upper and lower plate fasteners 212 to the belt ends 15b, any of the rivet and anvil nail assemblies, shown and described above, may be used with each nail being driven through one of the four openings 34a into a first belt end 15b from the top side thereof and with each nail of a second set of four rivet anvil nail assemblies being driven through the openings 34b into the other belt end. The nails pierce the belt and, after being stopped by the anvil means, cause the deformation of the lower rivet end in the manner above described. While the anvil means may take various forms, there is by way of illustration, shown another anvil means 43b with guides thereon for the plate fasteners (FIGS. 15, 16 and 17) which will now be described.

The anvil means 43b, as shown in FIG. 15, includes a lower channel of the same construction as the channel 43 hereinabove described in connection with FIGS. 1-5. However, rather than having buttons 71 in apertures 77 in the channel web 75, the apertures 77b in channel shown in FIG. 15 are free of buttons. The openings 77b are of course arranged to fit the pattern of openings for the sets of four fasteners used with each plate fastener 212. As best seen in FIG. 15, an anvil plate 107 having the integral upstanding anvil projections 105 is placed on the top surface 73b of the channel web 75b. The pattern of openings 79b in the anvil plate 107 is in accordance with the openings 34a and 34b in the plate fasteners 212. Super-imposed immediately above the anvil plate 107 is a bottom locating guide 221 which, as best seen in FIG. 16, has a central opening 223 therein for receiving an upstanding post 225. The bottom guide 221 also has two sets of apertures 224 which are spaced in the manner of the spacing 34a and 34b on a plate fastener 212 and in the manner of the projections 105 on the anvil plate 107. Bottom guide 221 is superimposed over anvil projections 105 or buttons 71 so they protrude through openings 224 in the guide 221. Bottom guide 221 is now located relative to the holes in channel web 75b and anvil plate 107.

For the purpose of receiving and locating an end one of a string of bottom plate fasteners 212, the bottom guide 221 has a slot 229 in its other edge opposite the guide post openings 223 into which is fitted the end one of the string of bottom plate fasteners 212. Rounded ends 231 of a bottom plate fastener 212 fitted into a slot 229 will abut edges 233 of the guide 221 and a longitudinal side 235 of the fitted plate fastener will abut side edge 237 of the guide 221. In this manner, the end one of the string of bottom plate fasteners 212 will be properly positioned relative to the openings 79b in the anvil plate 107 and the openings 71b in the web 75b of the channel.

At the opposite end of the channel web 75b there is another upstanding post 225 (not shown) and also another similar bottom guide 221 (not shown) for receiving in its slot 229 a bottom plate fastener at the other end of the string of bottom plate fasteners 212. Herein, the individual plate fasteners 212 are preferably adjoined to each other by short, thin integral tab portions 236 which may be readily broken so that the plate fasteners operate individually and so that a predetermined number of plate fasteners may be broken from a longer string to form a string related to a given width of belt. Thus, by aligning the two opposite end lower plate fasteners 212 of the string in the slots 229 in the opposite bottom guides 221, the remaining lower plate fasteners 212 will also be properly positioned to receive the anvil nail and rivet assemblies and to co-operate with the underlying anvil means.

With the lower string of plate fasteners 212 in place, the opposite belt ends 15b are the aligned and placed on the lower plate fasteners 212, the interface of the belt ends disposed at the central areas 217 of the bottom plate fasteners 212. Only one belt end 15b is shown for purposes of clarity of FIG. 15. A suitable gauge (not shown), which may be attached to the anvil support means, may be used to assist in aligning and holding the belt ends 15b.

With the belt ends disposed over the lower plate fasteners 212, a string of upper plate fasteners 212 is then aligned and placed on the top of the belt ends 15b. To align the upper plate fasteners 212, a pair of upper guides 241, as best seen in FIG. 17, are also secured to the posts 225 upstanding from the channel web 75b. More specifically, the upper guide 241 is formed with a first opening 243 for receiving the post 225. Preferably, a second opening 245 is formed in the plate-like body of the upper guide 241 for fitting over a second upstanding post 247 which is secured at its lower end to the web 75b. The upper guide 241 also has two guide pins 249 therein. The central ones of the openings 34a and 34b on the end one of the string of the upper plate fastener are aligned with guide pins 249 in the upper guide 241. By inserting guide pins 249 downwardly into the center openings 43a and 43b in end ones of the string of plate fasteners 212, the string of upper plate fasteners may be properly aligned. That is, the upper string of plate fasteners 212 are aligned relative to apertures 79b in the anvil plate 107 and to the apertures 34a and 34b in lower string of plate fasteners 212.

The upstanding posts 225 and 247 are preferably removably secured to the web 75b of the anvil means 43b with a longitudinal array of holes being provided so that the posts may be removed to accommodate different widths of belts. More particularly, the posts 247 may have its lower end threaded with a lower nut 251 threaded thereon and abutting the underside of the web 75b and with an upper nut 253 threaded onto the post 247 and abutting the upperside of the web 75b. A nut 255 on the post 247 holds the outer end of the upper guide 241 in a horizontal plane. In a similar manner, the post 225 may have a nut or head portion 259 on its lower end abutting the underside of the web 75b. An intermediate nut 260 threaded on the post 225 is turned to abut the top of the guide plate 221 to clamp it tightly against the anvil plate 107 and the channel web. Preferably, the upper end of the post 225 is also threaded to receive an upper nut 261 threaded thereon for clamping against the upper guide 241 to hold the assemblies in locked position during the initial fastening of the plate fasteners 212 to the belt. After fastening the central ones of plate fasteners 212 with the riveted nail assemblies, the top guides 241 may be removed to expose the rivet receiving openings 34a and 34b in the end ones of the string of plate fasteners 212.

In operation of the apparatus shown in FIG. 15, the lower guides 221 are affixed in proper position by projecting the posts 225 through apertures 223 and by superimposing guide apertures 224 over anvil projections 105 or buttons 71 in anvil plate 107. Then, the opposite end ones of the string of lower plate fasteners 212 are fitted in slots 229 with rounded ends 231 on the fasteners abutting the surfaces 233 of the guide 221 and with longitudinal fastener walls 235 abutting the side edges 237 of the guide 221. Then, the belt ends are abutted and located over the central areas 217 of the lower string of belt fasteners 212 and held in a suitable manner.

The upper string of plate fasteners 212 are then placed over the belt ends with their central areas 217 over the interface between the belt ends 15b. The top guide plate 241 is positioned on the posts 225 and 247 and guide pins 249 are inserted into the center apertures 34a and 34b on the opposite end ones of the string of upper plate fasteners. Nuts 261 may be tightened to clamp the top guides 241 in place after guide pins 249 have been inserted into the center apertures 34a and 34b of the end of the end ones of the top plate fasteners 212.

The anvil nail assemblies may then be driven through the respective openings 34a and 34b with the nail shanks piercing the belt and moving through the respective belt ends until the stop surfaces 46b thereon abut the stop surfaces 47b on the anvil plate 107. Whereupon, further hammering on the upper rivet heads causes the lower ends 57b of the rivets to move downwardly breaking the bonding means 59d between rivets and anvil nails. The anvil surfaces 44b flare the bottom ends of the rivets outwardly into engagement with the anvil surfaces 48b on the upstanding projecting means 105 which complete the deformation of the lower rivet ends to form the lower rivet heads.

Figure 19:
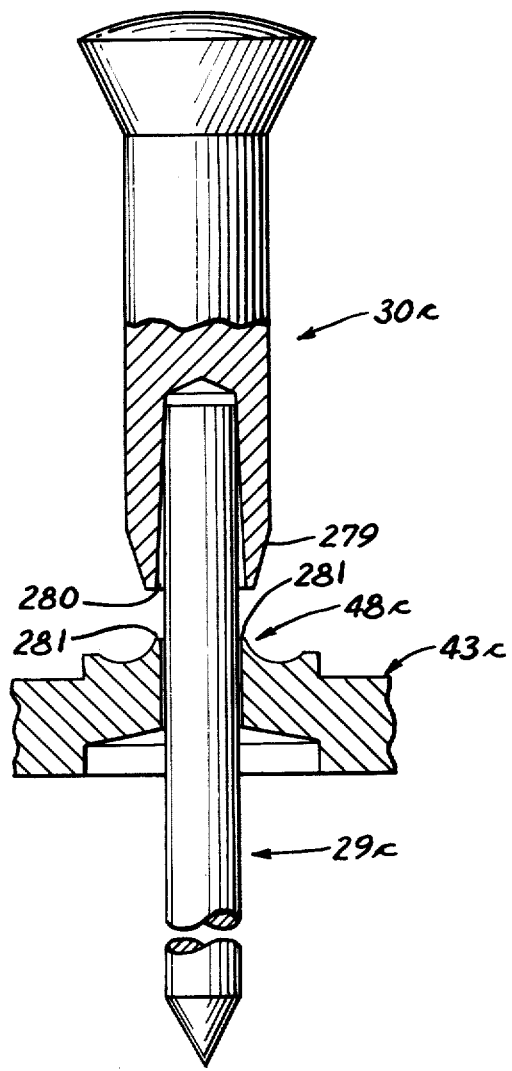
FIG. 19 is a view of another embodiment of the invention.

In accordance with a further embodiment of the invention shown in FIG. 19, the nail 29c may be formed without the enlarged shoulder carrying the anvil surface so that the entire spreading of the lower end of the rivet 30c is by the anvil surface means 48c on a support means 43c. Preferably, lower end 279 of the rivet is tapered to facilitate penetration through the belt and an annular space 280 exists between the nail and rivet to facilitate initial flaring of the rivet after thin, annular edge 281 at the top of the anvil surface 47c enters the annular space 280. Continued flaring of the lower rivet end into a rivet head breaks the adhesive bond between the rivet and nail, as hereinabove described. Thus, the anvil surface for separating the nail from the rivet and for initially flaring the rivet end may be at a position other than on the nail although the use of the anvil nail surface for these functions is preferred. The thin annular edge 281 on the anvil means 43c is preferably hardened; but it is subject to failure because of its thin cross section.

From the foregoing, it will be seen that the present invention provides a new and improved riveting system for riveting elements together where it is difficult to have access to the interior ends of the rivets for deformation by a rivet tool. Also, it will be appreciated that the present invention provides a novel rivet and anvil assembly with an anvil means co-operating with the lower end of the rivet to flare the same. In the preferred embodiments, the nail functions initially as a pilot for penetrating one element and for guiding the rivet through openings in the other element and, when arrested, functions as an anvil to deform the inner ends of the rivet into rivet heads. During this deformation, the bond between the rivet end nail is broken so that the anvil support means and the nails may be readily removed.

While a preferred embodiment has been shown and described, it will be understood that there is no intent to limit the invention by such disclosure but, rather, it is intended to cover all modifications and alternate constructions falling within the spirit and scope of the invention as defined in the appended claims.

I claim:

1. In a belt fastener system for attaching ends of a belt together, the combination comprising:
    belt fastener means comprising an upper element for overlying one side of the belt end and a lower element for underlying the other side of the belt end, said upper and lower elements each having a plurality of aligned apertures therein,
    a plurality of rivets each for insertion through an aperture in said top element and an aligned aperture in said bottom element, each of said rivets having a head at one end for engaging one of said upper or lower elements, a nail secured to the other end of said rivet for penetrating the belt and for guiding the other end of the rivet into the aperture in opposite one of said elements, a first anvil surface on said nail disposed beneath the other end of said rivet for initially deforming and flaring outwardly the other end of said rivet, a support means for supporting the lower elements of said belt fastener means and for receiving and holding said nails therein, and second anvil surfaces on said support means disposed adjacent said first anvil surfaces and co-operating with said first anvil surface by further deforming and bending said other end of said rivets for engagement with said lower element, 2. A system in accordance with claim 1 in which said apertures in said lower element have a tapered wall defining an enlarged recess for receiving the rivet end, said first anvil surface comprising an arcuately-shaped, concave shoulder on said nail located immediately adjacent the other end of said rivet with said concave shoulder facing said other end of said nail, said second anvil surface means bending said rivet ends upwardly and into said enlarged recesses.

3. A system in accordance with claim 1 in which said nail has an upper end telescoped into an opening in the other end of said rivet and in which means releasably secures said upper end to said rivet until said rivet end is deformed thereby releasing said nail from said rivet.

4. A belt fastener system in accordance with claim 1 in which said upper element is a plate belt fastener and said lower element is a plate belt fastener, and said rivets join each of said plate belt fasteners to both of the belt ends.

5. A belt fastener in accordance with claim 1 in which said belt fastener means comprises a hinge belt fastener with a hinge pin receiving portion joining said upper and lower elements.

6. An anvil nail and rivet assembly for use in fastening a belt fastener to a belt end comprising:
    a rivet having a longitudinally extending body and a head at one end of said body,
    there being a longitudinally extending bore at the other end of said body opening into the other end of said rivet body and defining a circumferential wall for flaring outwardly when attaching the rivet,
    an anvil nail having an upper end releasably secured to said other end of said rivet, a pointed lower end on said nail for penetrating a belt, an elongated shank on said anvil nail extending upwardly from said lower pointed end,
    an anvil surface on said upper end of said nail disposed beneath said other end of said rivet and at the upper end of said shank, said anvil surface including an enlarged shoulder surface on the upper portion of said shank extending outwardly to flare and roll said other end of said rivet
    and a stop surface on said anvil nail for limiting travel of said nail and allowing said rivet to continue traveling with said other end being deformed by said anvil surface.

7. A nail and rivet assembly in accordance with claim 6 in which said anvil surface has an upwardly opening and arcuately-shaped curvature thereon for flaring said other end of said rivet.

8. A nail and rivet assembly in accordance with claim 6 in which an upper end of said nail telescopes into said bore in said rivet and a bonding means within said bore bonds said upper end of said nail to said rivet.

9. A nail and rivet assembly in accordance with claim 8 in which the end of the rivet for flaring has an upwardly increasing thickness for its cross section as defined by a tapered bore and in which said upper end of said nail has a taper complementary to the taper of said bore.

10. A belt fastener system for fastening belt fasteners to a belt end without having to turn over said belt end comprising,
- at least one belt fastener having an upper plate for overlying one side of said belt and a lower plate for underlying the other side of said belt, said upper and lower plates having a plurality of aligned apertures therein,
- a stationary support means for supporting the lower plate of said fastener and for supporting the belt end and having openings therein for alignment with said apertures in said lower plate fo said fastener,
- locating means on said supporting means for locating said fastener thereon with said apertures in alignment with said openings in said support means,
- a plurality of rivet and pilot nail assemblies for insertion into said apertures in said fastener plates,
- said rivet and pilot nail assemblies comprising a rivet and a nail having a pointed end for penetrating the belt,
- stop surface means on said support means for engaging the nails received in said openings of said support means,
- first anvil surface means on said nails operative after travel of said nail through said belt to engage said other end of said rivet for deformation thereof by said anvil surface means during further downward movement of said rivet, and second anvil surface means on said support means for co-operating with said first anvil surface means by further deforming said other ends of rivets and for deflecting upwardly said deformed rivet ends tightly against said lower plates.

11. A system for riveting one element to another element where the elements may preclude access to one side thereof, said system comprising,
- a nail for insertion from the accessible side of said first and second elements to the other side thereof, said nail having an elongated cylindrical shank and a lower pointed end,
- a rivet having a preformed exposed head thereon for receiving an application of force thereto at said accessible side of said elements,
- means securing an inner end on said rivet to one end of said nail for movement with said nail through said first and second elements and for automatic release of said nail upon deformation of said rivet end,
- and an arcuate upwardly opening and outwardly extending anvil surface on said nail for engaging and flaring outwardly said inner end of said rivet, and means for arresting movement of said nail and for holding said nail.

12. A system in accordance with claim 11 in which said means for arresting movement of said nail and for holding said nail comprises an anvil support means with openings for receiving said nail therein and stop means on said anvil support means for abutting said nail when said nail has traveled to a certain position in said anvil support means.

13. A system in accordance with claim 12 in which said anvil support means comprises a first planar surface for holding said elements, and in which second anvil surfaces project upwardly of said planar surface for engaging said deformed portion of said rivet end for further shaping a rivet head on said inner end of said rivet.

14. A system in accordance with claim 11 in which a portion of said nail projects into said inner end of said rivet and in which a bonding agent bonds said nail portion to said rivet to secure them together until said rivet end is flared to break said bonding agent.

15. An anvil support means for supporting belt fasteners and for receiving anvil nails secured to lower ends of rivets comprising:
- a supporting base means for supporting a plurality of belt fasteners disposed on the underside of the belt,
- said supporting base means having a plurality of openings therein in a predetermined pattern for alignment with each of the rivet receiving openings in the belt fasteners thereon and for receiving therein said anvil nails piercing said belt and passing through said rivet receiving openings in said belt fasteners,
- locating means on said supporting base means for locating said belt fasteners in predetermined positions thereon with said rivet receiving openings being aligned with said openings in said supporting base means,
- and stop surface means on said supporting base means at each of said openings for abutment by an anvil nail to limit further downward movement of said anvil nail and to hold the said anvil nail during peening of the lower end of the rivet by said anvil nail into a lower rivet head.

16. An anvil support means in accordance with claim 15 in which said supporting base means comprises a channel-shaped member having a pair of longitudinally extending and depending flanges each connected to a central web, said central web having said openings therein for receiving said anvil nails, the lower ends of the anvil nails projecting through said web and into a space between said flanges.

17. An anvil support means in accordance with claim 15 in which an upstanding projection means is provided around each of said openings for projecting above the plane of an upper planar support surface on said supporting base means, and an anvil surface on each of said upstanding projection means for further deformation of said rivet end upwardly against said belt fastener and into the lower rivet head.

18. An anvil support means in accordance with claim 17 in which said supporting base means includes a flat planar plate and in which said upstanding projection means are upstruck integral portions of said plate.

19. An anvil support means in accordance with claim 17 in which said upstanding projection means comprises separable buttons removably positioned within openings in said supporting base means.

20. A belt fastener system for fastening belt fasteners to a belt end comprising,
  at least one belt fastener having an upper plate for overlying one side of said belt and a lower plate for underlying the other side of said belt, said upper and lower plates having a plurality of aligned apertures therein,
  means for supporting the lower plate of said fastener and having openings therein for alignment with said apertures in said lower plate of said fastener,
  locating means on said supporting means for locating said fastener thereon with said apertures in alignment with said openings in said support means,
  a plurality of rivet and pilot nail assemblies for insertion into said apertures in said fastener plates,
  said rivet and pilot nail assemblies comprising a rivet and a nail having a pointed end for penetrating the belt, and
  anvil surface means operative upon travel of said nail through said belt to engage said other end of said rivet for deformation thereof of said anvil surface means during further downward movement of said rivet,
  said support means comprising a channel-shaped base having an upper central web, and said anvil surface means comprising a plurality of upstanding projections having said openings for receiving said nails and having anvil surfaces thereon for deforming said other ends of said rivets.

21. A system in accordance with claim 20 in which said projections are integral with said web.

22. A system in accordance with claim 20 in which said projections are separate buttons carried by said web.

23. An assembly in accordance with claim 20 in which said anvil surface means comprises a surface on the other end of said nail for deforming said rivet end, said locating means comprises a plurality of upstanding blocks on said web, said blocks having transversely aligned openings therein to receive a gauge pin to align hinge pin receiving portions of said belt fasteners, and locating surfaces on said blocks for engaging sides of said fasteners and spacing said fasteners at predetermined intervals along said belt end.

* * * * *

UNITED STATES PATENT AND TRADEMARK OFFICE
CERTIFICATE OF CORRECTION

PATENT NO. : 3,913,180
DATED : October 21, 1975
INVENTOR(S) : Winston Charles Pray It is certified that error appears in the above-identified patent and that said Letters Patent are hereby corrected as shown below:

Column 1, line 38, insert a space in "thebelt".

Column 2, line 58, insert "a" after --is--.

Column 7, line 48, "lenght" should be --length--.

Column 8, line 11, "aubt" should be --abut--.

Column 9, line 19, delete the hyphen in "superimposed".

Column 11, line 6, second occurrence delete "of the end".

Column 12, line 21, "," should be --.--.

Column 13, line 26, "fo" should be --of--.

Signed and Sealed this twenty-fourth Day of February 1976

[SEAL]

Attest:

RUTH C. MASON
Attesting Officer

C. MARSHALL DANN
Commissioner of Patents and Trademarks